UNITED STATES PATENT OFFICE.

RICHARD DORMER, OF GARSTON, COUNTY OF LANCASTER, ENGLAND.

OBTAINING CHLORINE.

SPECIFICATION forming part of Letters Patent No. 427,467, dated May 6, 1890.

Application filed April 29, 1889. Serial No. 308,951. (No specimens.)

*To all whom it may concern:*

Be it known that I, RICHARD DORMER, F. C. S., a subject of the Queen of Great Britain, residing at Garston, in the county of Lancaster, in the Kingdom of England, have invented certain new and useful Improvements in Obtaining Chlorine, of which the following is a specification.

In the ordinary process of obtaining chlorine by acting upon manganese dioxide ($MnO_2$) with hydrochloric acid, (HCl,) one half only of the chlorine (Cl) in the hydrochloric acid (HCl) used is by theory evolved, the other half remaining in solution as manganese chloride, ($MnCl_2$.) Thus:

(1) $MnO_2 + 4HCl = MnCl_2 + Cl_2 + 2H_2O$.

By this invention I propose, first, to obtain the whole of the chlorine in the hydrochloric acid (HCl) by taking advantage of the fact that in the presence of sulphuric acid ($H_2SO_4$) hydrochloric acid (HCl) acts upon the manganese dioxide ($MnO_2$) according to the following reaction:

(2) $MnO_2 + 2HCl + H_2SO_4 = 2Cl + MnSO_4 + 2H_2O$, and thus theoretically producing the whole of the chlorine contained in the hydrochloric acid, (HCl.) In the ordinary process the manganese chloride ($MnCl_2$) formed by Reaction 1 is treated by the Weldon or Dunlop process, in order to recover the manganese in the state of manganese dioxide. By my process the whole of the chlorine is obtained according to Reaction 2, and the manganese (Mn) is produced in the state of manganese sulphate, ($MnSO_4$,) which in this condition is wholly unsuitable for recovery as manganese dioxide ($MnO_2$) by either the Weldon or Dunlop process.

By this invention I propose to convert the manganese sulphate ($MnSO_4$) into manganese chloride ($MnCl_2$) by the addition of a solution of calcium chloride ($CaCl_2$) in excess, as shown by the following reaction:

(3) $MnSO_4 + CaCl_2 = MnCl_2 + CaSO_4$, the calcium chloride ($CaCl_2$) for this purpose being obtained as a by-product in the Weldon or Dunlop process, and which at the present time is run to waste. The manganese chloride ($MnCl_2$) thus formed is separated by settling or filtering from the calcuim sulphate, ($CaSO_4$,) and is then in a suitable condition to be treated for the recovery of the manganese as manganese dioxide ($MnO_2$) by the Weldon or Dunlop process, as at present. The loss of manganese in recovery can be supplied by dissolving native manganese dioxide or pyrolusite ($MnO_2$) in hydrochloric acid (HCl) in the ordinary way, the solution thus produced being neutralized in the ordinary manner by addition of chalk or other calcium carbonate ($CaCO_3$) or other suitable agent, this neutral manganese chloride ($MnCl_2$) being added to the solution of $MnCl_2$ as formed by Reaction 3.

From the foregoing description of this invention it will be seen that the various reactions involved are as follows:

(1) $MnO_2 + H_2SO_4 + 2HCl = 2Cl + MnSO_4 + 2H_2O$.
(2) $MnSO_4 + CaCl_2 = MnCl_2 + CaSO_4$.
(3) $MnCl_2 + lime + air = Weldon\ mud + CaCl_2$.

*Reaction* 1.—This may be worked in the usual stone stills or in a suitably-shaped iron still lined with lead, brick, or such material as may be found most suitable, the heat being supplied by steam or direct heat, as may be found most suitable for the apparatus used; the manganese dioxide ($MnO_2$) or Weldon mud, as the case may be, being supplied with a quantity of sulphuric acid ($H_2SO_4$) sufficient to convert the whole of the compounds present into sulphates, and the hydrochloric acid (HCl) being added in slight excess over and above the amount equivalent to the available oxygen of the manganese dioxide ($MnO_2$) or Weldon mud employed, thus preventing any extra loss of manganese in comparison with the usual method of dissolving in hydrochloric acid (HCl) alone, while the sulphuric acid ($H_2SO_4$) is kept at its lowest possible limit necessary for the above purpose of converting the said compounds into sulphates.

*Reaction* 2.—Before proceeding with this part of the process the product from the stills after generation of the chlorine (as shown in Reaction 1) is neutralized by chalk or other suitable material in a convenient vessel and chloride of calcium then added in sufficient excess to convert the whole of the manganese into chloride, ($MnCl_2$,) leaving enough calcium chloride ($CaCl_2$) in solution for the satisfactory working of the usual Weldon process of recovery; but in the case of the Dunlop an excess is not necessary. The calcium sulphate ($CaSO_4$) is allowed to settle and the supernatant manganese chloride ($MnCl_2$) run to the stock-tanks ready for the recovery. The calcium sulphate ($CaSO_4$) is either washed by decantation with calcium-chloride ($CaCl_2$) solution or water, ($H_2O$,) as may be found most convenient; or it may be filtered through a filter-press or other suitable separator and washed in order to cleanse it from the manganese solution. The calcium sulphate ($CaSO_4$) could be dried and used for any convenient purpose. The manganese is now in solution as manganese chloride, ($MnCl_2$,) and consequently suitable for the recovery of the manganese by the usual method of Weldon or Dunlop, as at present, by means of lime or chalk, respectively.

From the foregoing description of this process it will be seen that in order to obtain the whole of the chlorine in the hydrochloric acid (HCl) used the only extra cost of material is that of the sulphuric acid, ($H_2SO_4$.)

In the ordinary process the chlorine produced is theoretically fifty per cent. of the amount contained in the HCl, while the various practical losses in the production of bleaching-powder or chloride of lime reduce the practical production to about one-half the theoretical—equal to a loss of, say, twenty-five per cent. of the chlorine.

By this invention the chlorine produced is theoretically one hundred per cent. of the amount in the HCl, and taking the same practical loss as before—namely, twenty-five per cent.—the practical result is, say, three times that of the ordinary process.

I claim as my invention—

1. The process of obtaining chlorine which consists in forming an aqueous mixture of sulphuric acid, hydrochloric acid, and manganese dioxide, (or Weldon mud,) and separating the chlorine, neutralizing, adding calcium chloride in excess to the aqueous residue, and thereby throwing down calcium sulphate, separating the latter, and treating the remaining solution of manganese chloride and calcium chloride with chalk or lime to form Weldon mud, substantially as described.

2. The improvement in the process of obtaining chlorine which consists in adding to the manganese dioxide or Weldon mud half the usual amount of hydrochloric acid used in the Weldon process, and also sufficient sulphuric acid to convert into sulphates all the compounds of manganese and lime present, and then adding sufficient chloride of calcium to reconvert the sulphate of manganese into chloride, substantially as described.

3. The improvement in the process of obtaining chlorine and sulphate of lime which consists in adding to the Weldon mud only half the usual amount of hydrochloric acid and supplying the deficit with sulphuric acid and calcium chloride, collecting the chlorine which comes off, separating the chloride-of-manganese solution from the precipitate, whereby the whole of the chlorine in the hydrochloric acid is obtained in a useful form and an exceedingly pure and fine-grained calcium sulphate is obtained, substantially as described.

In testimony whereof I have signed my name to this specification in the presence of two subscribing witnesses.

RICHARD DORMER.

Witnesses:
CORNELIUS HOPE,
WM. P. THOMPSON.